United States Patent
Nicholson et al.

(10) Patent No.: US 11,935,324 B2
(45) Date of Patent: Mar. 19, 2024

(54) CAMERA PRIVACY SWITCH AND FILTER TO INHIBIT BIOMETRIC DATA COLLECTION

(71) Applicant: Lenovo (United States) Inc., Morrisville, NC (US)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 136 days.

(21) Appl. No.: 17/362,465

(22) Filed: Jun. 29, 2021

(65) Prior Publication Data

US 2022/0414365 A1 Dec. 29, 2022

(51) Int. Cl.
| | | |
|---|---|---|
| *G06V 20/00* | (2022.01) | |
| *G06V 10/22* | (2022.01) | |
| *G06V 10/94* | (2022.01) | |
| *G06V 40/16* | (2022.01) | |
| *H04N 23/667* | (2023.01) | |
| *H04N 23/80* | (2023.01) | |
| *G06V 40/50* | (2022.01) | |

(52) U.S. Cl.
CPC .......... *G06V 40/171* (2022.01); *G06V 10/235* (2022.01); *G06V 10/94* (2022.01); *G06V 20/00* (2022.01); *H04N 23/667* (2023.01); *H04N 23/815* (2023.01); *G06V 40/53* (2022.01)

(58) Field of Classification Search
CPC .... G06V 40/171; G06V 10/235; G06V 10/94; G06V 20/00; G06V 40/53; H04N 5/23235; H04N 5/23245
See application file for complete search history.

(56) References Cited

U.S. PATENT DOCUMENTS

| | | | |
|---|---|---|---|
| 6,930,707 B2 * | 8/2005 | Bates .................... | G06V 40/18 348/78 |
| 8,126,190 B2 * | 2/2012 | Jung ..................... | G06V 20/52 382/100 |
| 2008/0239134 A1 * | 10/2008 | Hsu ....................... | G02B 15/10 348/E5.022 |
| 2015/0163408 A1 * | 6/2015 | Laroia ................... | H04N 5/77 348/208.1 |
| 2017/0295229 A1 * | 10/2017 | Shams ................... | G06F 3/016 |
| 2018/0041712 A1 * | 2/2018 | Nakagawara .......... | H04N 23/63 |
| 2018/0061010 A1 * | 3/2018 | Akselrod ............ | H04N 21/4627 |
| 2018/0192014 A1 * | 7/2018 | Moore, Jr. ............ | H04N 9/3141 |
| 2019/0331919 A1 * | 10/2019 | Huo .................... | G02B 27/0176 |
| 2020/0278833 A1 * | 9/2020 | Noyes ................... | H04N 23/88 |
| 2020/0311305 A1 * | 10/2020 | Kim ......................... | G06T 7/74 |

* cited by examiner

*Primary Examiner* — Emily C Terrell
*Assistant Examiner* — Ahmed A Nasher
(74) *Attorney, Agent, or Firm* — Kunzler Bean & Adamson

(57) ABSTRACT

Apparatuses, methods, systems, and program products are disclosed for capturing an image and determining whether a switch is in a filtering position or a non-filtering position. When the switch is in the filtering position, the camera apparatus detects a switch position and determines whether the switch is in the filtering position or the non-filtering position. The camera captures the image, including audio/visual signals, while the switch is detected to be in the filtering position and modifies the image to inhibit biometric data collection from the image in response to the switch being in the filtering position when the image is captured.

20 Claims, 5 Drawing Sheets

CAMERA PRIVACY SWITCH AND FILTER TO INHIBIT BIOMETRIC DATA COLLECTION

FIELD

The subject matter disclosed herein relates to computing devices and more particularly relates to privacy and the use of artificial intelligence to collect user biometrics.

BACKGROUND

Computing devices equipped with computer vision may gather biometric information or data without user knowledge or consent. Artificial Intelligence (AI) uses image processing to determine private/personal user characteristics like age, gender, race, etc. Computer vision may detect heart rate, blood pressure, etc. Additional private information may be collected through cloud computing. Present solutions to preserve privacy involve disabling and/or covering the camera to prevent computer vision or AI from collecting any biometric data, e.g., by not allowing any light or signal to reach the aperture of the computer vision.

BRIEF SUMMARY

Apparatuses, methods, systems, and program products are disclosed for modifying an image when a switch is determined to be in a filtering position when the camera captures the image. In one embodiment, the sensing apparatus is a camera that has a switch and an image modifier. The image modifier captures an image. The switch selectively moves between a filtering position and a non-filtering position. The image modifier detects whether the switch is in the filtering position or the non-filtering position and captures the image using the camera while the switch is detected to be in the filtering position. The image is modified to inhibit biometric data collection from the image in response to the switch being in the filtering position while the image is captured.

In one embodiment, a method is described to detect the position of a physical camera switch when the image is captured. The physical camera switch has a filtering position and a non-filtering position. The camera captures the image while the physical camera switch is in the filtering position. The captured image is modified to inhibit biometric data collection from the image in response to the physical camera switch being in the filtering position while the image is captured.

In one embodiment, a computer program product is described that has a computer-readable storage medium having program instructions embodied therewith. The program instructions are executable by a processor to cause the processor to detect, by using the processor of an electronic device, the position of a physical camera switch. The physical camera switch has a filtering position and a non-filtering position. The camera captures an image using a camera of the electronic device while the physical camera switch is detected in the filtering position. The computer program product modifies the image to inhibit biometric data collection from the image in response to the physical camera switch being in the filtering position while the image is captured.

BRIEF DESCRIPTION OF THE DRAWINGS

A more particular description of the embodiments briefly described above will be rendered by reference to specific embodiments illustrated in the appended drawings. Understanding that these drawings depict only some embodiments and are not, therefore, to be considered to be limiting of scope, the embodiments described and explained with additional specificity and detail through the use of the accompanying drawings, in which.

DETAILED DESCRIPTION

Figure 1:
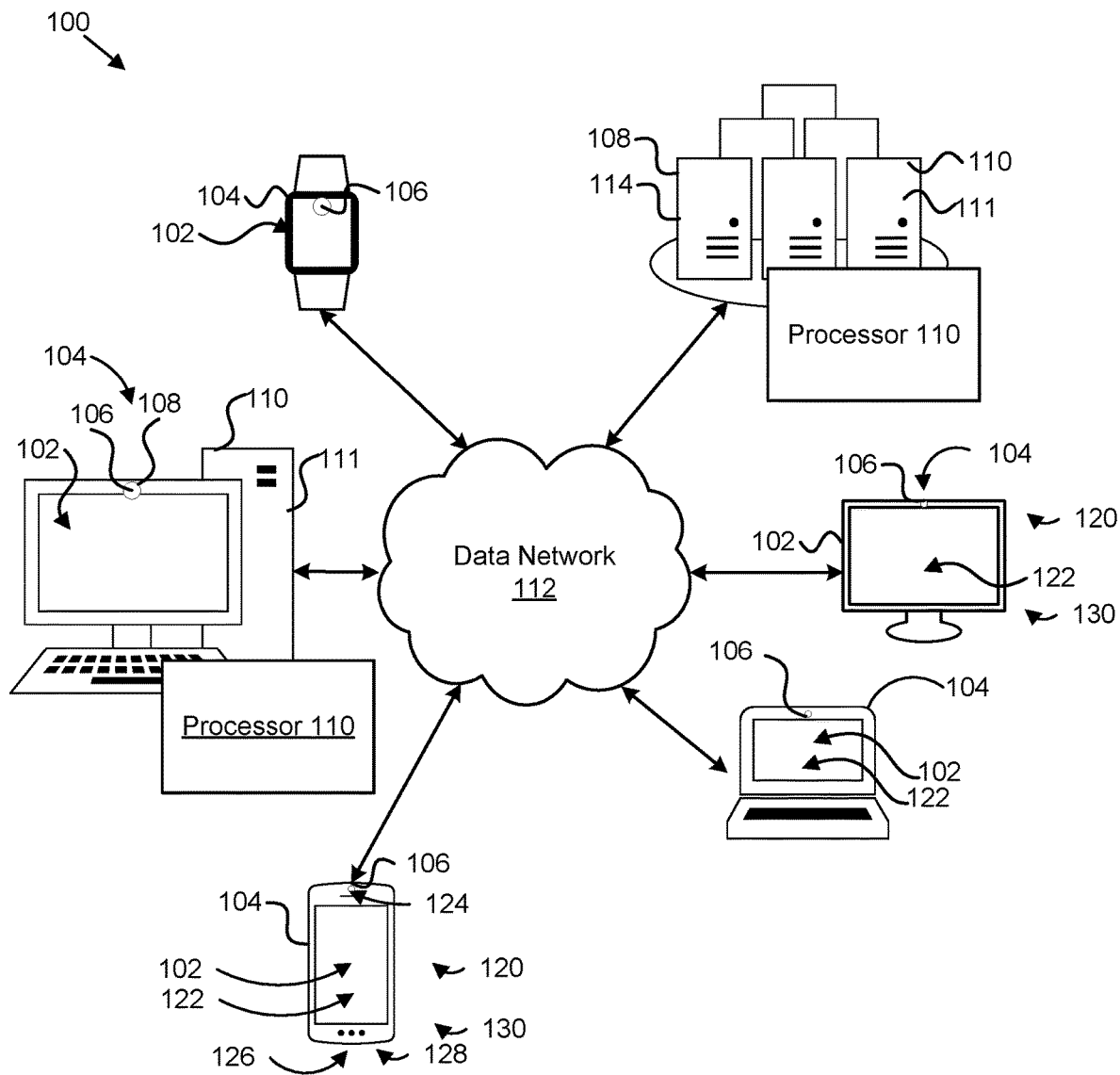
FIG. 1 is a schematic block diagram illustrating one embodiment of a system for filtering a feature of a signal during operation of the computing device.

Modern computing devices, such as personal laptops and desktop computers, are commonly equipped with cameras to facilitate teleconferences and virtual meetings. Concerns that the camera can distribute the audio/visual signals and gather sensitive user biometric information has prompted some users to block/cover the apertures of webcam cameras and/or obstruct/mute microphones from collecting ambient signals. As used herein, a camera is a sensing device (e.g., sensor) that captures a phenomenon from the surrounding environment and generates a transmittable/storable signal (e.g., digitizing an audio/visual signal). Artificial Intelligence (AI) processes capture images (video and audio signals) and can determine private/personal user characteristics. For example, a malevolent user could use data collected from an unsuspecting user to identify and/or determine the user's age, gender, race, or other personal/sensitive information. Hardware can include biometric algorithms to detect heart rate, blood pressure in real-time—e.g., during a video teleconference. Some users wish to protect themselves from inadvertent distribution of this potentially sensitive information. Additionally, data networks can obtain, collect, and distribute the user's private information through cloud computing.

A mechanism is devised to selectively obstruct parts/features of the audio/visual signals. Specific features of the signal that a biometric algorithm can use to calculate this private information are targeted. The system can obstruct features of the signal without other human users of the video conference detecting a visual/audio change of the user. For example, a filter (including digital filters programmed in the firmware and/or analog distortion lenses) can obstruct and/or provide an image/audio modifier to prevent collecting and distributing personal information.

The filter can use a physical or electrical mechanism, such as a crystalline and/or distortion lens, an embedded program that controls the camera, or some combination of the two. A switch enables the user to control which features are obstructed from AI biometric algorithms. In various embodiments, the end-user may be unaware of the modifications when the filter (e.g., image modifier) obstructs a feature from an AI biometric algorithm. For example, by changing a bit value range of the amount of red light passed to the camera, AI biometric algorithms for determining a user's heart rate are obstructed, but a user of the system may not notice or perceive a visual change.

In one embodiment, an apparatus is described comprising a camera that captures an image. A switch selectively moves between a filtering position and a non-filtering position. The camera determines whether the switch is in the filtering position or the non-filtering position. When the camera captures the image while the switch is detected in the filtering position, the image is modified to inhibit biometric data collection from the image. The image is modified in response to the switch being in the filtering position while the image is captured.

In one embodiment, an image modifier is coupled to the switch. The image modifier disrupts biometric algorithms and prevents biometric collection. A cover can also disrupt biometric algorithms, but physically blocks all visible light and/or sound when the cover extends over the camera.

In various embodiments: a filter (e.g., a distortion lens) obscures a portion of the visible light passing through the filter to the camera; the processor operates the camera at a reduced frame per second (fps) rate in response to the switch being in the filtering position; an image modifier has a distortion lens, wherein the processor operates the camera to capture a reduced resolution of red light in response to the switch being in the filtering position. In some embodiments, the camera is operated at a reduced frame per second (fps) and/or to capture a reduced bitwise resolution of red light.

In one embodiment, an image modifier includes a filter with a distortion lens that covers the camera and firmware of the camera that utilizes the processor to inhibit biometric data collection from the image in response to the switch being in the filtering position while the image is captured. In various embodiments, the image modifier is coupled to the switch. The image modifier includes an opening in a first position, a filter in a second position, and a cover in a third position.

In some embodiments, the image modifier slides a crystalline and/or distortion lens over the camera. In a specific embodiment, the opening is over the camera in the first position. The filter is over the camera in the second position, and the cover is over the camera in the third position.

In one embodiment, when the switch is in the filtering position, a firmware that operates the camera permits a selected biometric algorithm that a user consented to collect biometric data. In some embodiments, the switch in the filtering position includes a blur filter covering the camera and reducing a resolution of the image by inhibiting a least significant bit value for visible light. In various examples, when the switch is in the filtering position, the firmware of the camera operates the processor to inhibit a first biometric algorithm and permits a second biometric algorithm.

One embodiment of a method for modifying a signal includes detecting a position of a physical camera switch. The physical camera switch comprises a filtering position and a non-filtering position. The camera captures an image while the physical camera switch is detected to be in the filtering position and modifies the image to inhibit biometric data collection from the image in response to the physical camera switch being in the filtering position while the image is captured.

In embodiments, a filter has a crystalline lens that covers the camera. Firmware of the camera controls the processor to inhibit biometric data collection from the image in response to the physical camera switch being in the filtering position while the image is captured. For example, when the physical camera switch is in the filtering position, a firmware operates the camera to block a first biometric algorithm from collecting biometric information and permits a second biometric algorithm to collect data related to a user consented biometric feature.

In some embodiments, an opening over the camera receives unfiltered light without a filter. The opening is adjacent to the filter. The image modifier moves between a covered position that inhibits all light, the filtering position, and the non-filtering position that receives unfiltered light through the opening. In some embodiments, the filtering position comprises a crystalline lens filter and wherein obfuscating a facial feature comprises distorting the image via the crystalline lens.

A computer program product, in one embodiment, has a computer-readable storage medium with program instructions embodied therewith. The program instructions are executable by a processor to cause the processor to detect by using the processor of an electronic device, a position of a physical camera switch. The physical camera switch comprises a filtering position and a non-filtering position. The processor captures an image using a camera of the electronic device when the physical camera switch is detected to be in the filtering position. The processor modifies the image to inhibit biometric data collection from the image in response to the physical camera switch being in the filtering position while the image is captured.

FIG. 1 is a schematic block diagram illustrating one embodiment of a system 100 for selectively detecting, capturing, and/or modifying an image 102 on a computer or computing device 104. The system 100 uses a camera 106 on the computing device 104 to capture the image 102. The computing device 104 may include a distortion lens 108 that covers an aperture of the camera 106. The processor 110 may modify the image 102 captured by the camera 106 of the computing device 104.

Figure 2:
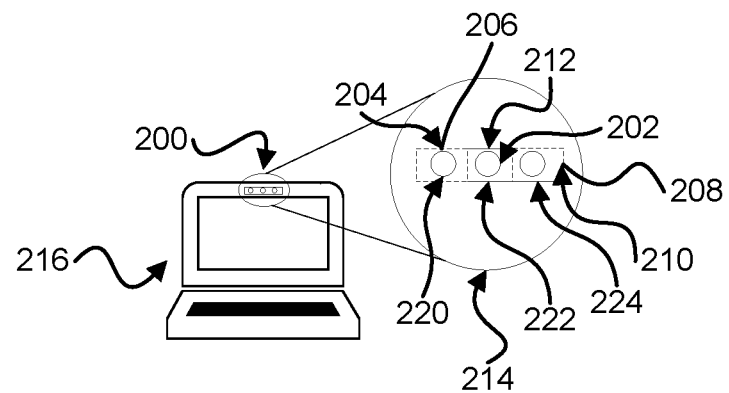
FIG. 2 is a schematic block diagram illustrating one embodiment of a switch for filtering a feature of a signal during operation of the computing device.
Figure 3:
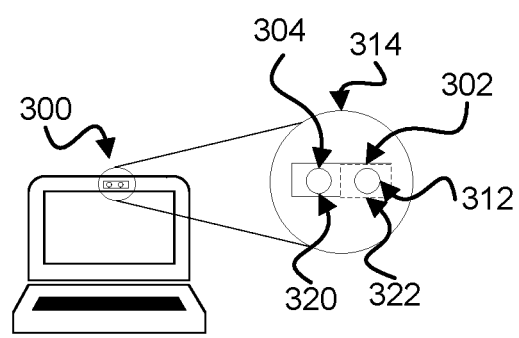
FIG. 3 is a schematic block diagram illustrating one embodiment of a switch for filtering a feature of a signal during operation of the computing device.

FIG. 2 represents a three-position switch 200, and FIG. 3 illustrates a two-position switch 300. In general, the three-position switch 200 has a filtering position 202, a non-filtering position 204, and/or a covered position 210. The non-filtering position 204 of the switch 200 has an opening 206 defining the non-filtering position 204. In the filtering position 202, a distortion lens 108 and/or processor 110 define operation of the filtering position 202. A cover 208 over the camera 106 blocks all light and defines the covered position 210. In various embodiments, the three-position switch 200 has two filtering positions 202, e.g., by replacing either the non-filtering position 204 or the covered position 210 with a second filtering position 202 that filters for different or additional features than the first filtering position. Similarly, the three-position switch 200 can have three different filtering positions (e.g., a first, second, and third filtering position). Each of these filters may have different filtering effects that screen for different biometric data that an AI biometric algorithm may use to determine/calculate personal or private information related to the user. In a specific embodiment, the filtering position 202 filters some, but not all the light passed to the camera 106, the non-filtering position 204 does not filter any light, and the covered position 210 blocks all light, such that no light reaches the camera.

In contrast, the two-position switch 300 of FIG. 3 has only a filtering position 302 and a non-filtering position 304. In contrast to customary switches for e.g., webcams, switch 300 has a filtering position 302 that permits filtered light (e.g., through a distortion lens) to reach the camera 106 and/or includes a processor 110 that modifies the captured image 102 and prevents biometric data collection without obstructing or blocking all light or audio/visual signals. Similar to the example above, switch 300 may include two filtering positions 302. In this configuration the non-filtering position 304 may have different, more, or less features 128 that are screened to prevent biometric data collection of personal data.

In various embodiments, the filtering position 302 may use an analog, digital, or combination of the two to inhibit data collection. For example, filtering position 302 may have a distortion lens 108 that filters the incoming light or may use firmware 111 of a processor 110 to modify the image 102. Specifically, the non-filtering position 304 can combine the opening 206 and the cover 208 in a single first position 320. The filtering position 302 can selectively combine features 128 of the distortion lens 108 and/or the filter 212 in a single second position 322. In a specific embodiment, filtering positions 302 are the same as or similar to filtering positions 202. Similarly, non-filtering positions 304 are the same as or similar to filtering positions 204. Reference herein is generally made to switch 200, but unless expressly noted otherwise, the description of the filtering position 202 and non-filtering position 204 on switch 200 applies equally to the description of switch 300, specifically filtering position 302 and non-filtering position 304.

Concerning FIGS. 1-3, when a physical camera switch, illustrated as switch 200, is detected or in the filtering position 202, the distortion lens 108 and/or the processor 110 of the computing device 104 may modify the image 102 produced by the camera 106 and inhibit biometric data collection. Specifically, the signal received from the analog distortion lens 108 can be augmented with the processor 110. In other words, a filter 212 having the distortion lens 108 and/or processor 110 inhibits the collection, storage, and/or retrieval of biometric data from the image 102 in response to the switch 200 being in the filtering position 202 while the image 102 is captured. This enables a user to control and/or remove biometric data from being collected/retrieved by the computing device 104, e.g., during the use of the camera 106.

In one embodiment, the system 100 includes one or more computing devices 104 having the switch 200 that fixes the distortion lens 108 over the camera 106. The system 100 may include one or more data networks 112 and/or one or more servers 114 that facilitate communication between the one or more computing devices 104 on the data network 112. For example, the server 114 may facilitate a video conference between a laptop and desktop computing device 104.

In embodiments, the firmware 111 on the processor 110 communicates with and/or controls various hardware components 120 on the computing device 104 and/or the server 114. In another embodiment, the processor 110 is located on the server 114 and controls the computing device 104. Processors 110 may be on both the computing device 104 and one or more servers 114. As used herein, the processor 110 can be located on a separate device (e.g., the server 114) and/or the processor 110 located directly on the apparatus or another location on the computing device 104.

Although a specific number of computing devices 104, circuit boards, hardware components 120 (e.g., cameras 106, displays 122, microphones 124, and speakers 126), data networks 112, and servers 114 are depicted in FIG. 1, one of skill in the art would recognize that the system 100 may include any number of computing devices 104, circuit boards, hardware components 120, data networks 112, and/or servers 114 can be implemented without varying the scope of the disclosure. As used herein, an image 102 includes audio/visual signals captured/displayed by any hardware component 120.

The computing devices 104 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, an IoT vehicle (e.g., car, boat, airplane, etc.) or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, system 100 includes one or more computing devices 104 electronically coupled to the data network 112. Each computing device 104 is encoded with firmware 111 that activates and controls various hardware components 120, such as the camera 106. Examples of hardware components 120 include the camera 106 capturing an image 102, a display 122 that displays the image 102, a microphone 124 for capturing sounds, and a speaker 126 for transmitting sounds. Firmware 111 on the processor 110 may provide a mechanism for controlling all or a part of the functionality, technology, and/or features 128 enabled/disabled on the hardware component 120. In general, enabling a feature 128 makes the technology available to the computing device 104. Similarly, disabling a feature 128 removes the associated technology from the computing device 104.

FIG. 1 illustrates the connection of various computing devices 104 within a data network 112 and FIGS. 2 and 3 illustrate a detailed view of the switch 200 on one computing device 104. The switch 200 enables a user to control the biometric data collection of the computing device 104 and/or the data network 112 by modifying the audio/visual signal 130 (e.g., image 102) transmitted by the computing device 104 onto the data network 112. In response to the switch 200 being in the filtering position 202, the distortion lens 108 and/or the processor 110 can modify the image 102 and/or audio signal 130 captured by the computing device 104 before it is transmitted onto the data network 112. Filtering position 202 inhibits undesired biometric data collection. Thus, switch 200 enables the user to selectively control personal biometric data collection, e.g., during a video conference call on a data network 112.

As described in greater detail below, this system provides control to the end-user to selectively prevent biometric data collection and, in various embodiments, may selectively modify the image 102 and/or signal 130 in such a way that a human operator cannot recognize the modification. For example, a filter 212 may include an image modifier 214 that changes one or more features 128 of a signal (e.g., an image 102 and/or audio/video signal 130) to prevent biometric data collection without a modification to the image 102 or signal 130 that would be noticeable to a user of the system 100.

In various embodiments, a switch 200 selectively moves (e.g., slides) between a filtering position 202 and a non-filtering position 204 on the computing device 104. For example, an image modifier 214 is physically coupled to the switch 200 over the camera 106. The image modifier 214 supports a disruption distortion lens 108 that disrupts biometric algorithms 216 and inhibits biometric data collection. The switch 200 may couple to a firmware 111 of the system 100. A cover 208 physically covers the camera 106 and blocks all visible light from reaching the camera 106 when the cover 208 is extended over and covers the camera 106, e.g., in the covered position 210.

With reference to FIG. 2 shows a three-position image modifier 214, and FIG. 3 shows a two-position image modifier 314. As shown, different types of filter 212 and filter 312 are shown. In various embodiments, filter 212 is the same as or similar to filter 312. The following general reference to filter 212 applies equally to filter 312. Filter 212 enhances user control over inhibiting particular and/or selective features 128 from biometric data collection. For example, the user can change the features 128 modified in the captured image 102 when the switch 200 is in the filtering position 202. The user can select and/or control which features 128 are inhibited. For example, the user can replace the distortion lens 108 in the image modifier 214 and/or selectively control the firmware 111 controlling the camera 106 to inhibit or select the biometric data collected.

The image modifier 214 uses filter 212 to modify the image 104 and obscure a feature 128 including user biometric data of the computing device 104. The feature 128 may include voice recognition and/or a facial feature 128, such as the eye dilation, a color bit value, a frame rate, or another portion of the sound/visible light passing through the filter 212 to the camera 106 used to identify the user and/or provide sensitive/personal information unique to the user. When the camera captures a color image that is represented by a bit value range, the bits can be divided into three groupings: e.g., 8 for red, 8 for green, and 8 for blue. Combinations of the bits value ranges are used to represent other colors.

In various embodiments, the image 104 includes a pixel format such as RGB, YUV, HSL, etc. The pixel format includes color channel that may be represented by an integer value. For example, a RGB32 pixel format has red (R), Green (G), and blue (B) color channels. Similarly, the image may include a pixel format for transparency (alpha). Each color channel is represented by an integer value (e.g., between 0 and 255). Specific examples of integer values for a RGB32 pixel format may include black (0, 0, 0), red (255, 0, 0), green (0, 255, 0), yellow (0, 0, 255), white (255, 255, 255), and combinations thereof. Each pixel in the image may be assigned a pixel value to represent the signal.

In some embodiments, a least significant bit value of a color, e.g., red, may be inhibited to reduce the resolution of the image. The size and/or color of the pixels in the image 104 can be increased/decreased and/or modified to reduce resolution and obstruct biometric data collection. In one example, the color assignment fixed to specific intervals. Specifically, pixel values may inhibit resolution of a least significant bit value for the color channel, e.g., by representing all reds between R(247-255) as R(255) and all reds between R(239-247) as R(247), etc.

In some embodiments, the sensor, e.g., camera 106, may capture a higher/lower bit depth for a pixel in the signal than is transmitted in the pixel format of the image 104. For example, the camera 106 may have a blur filter 212 placed in front of a lens to obstruct the captured bit depth. In various embodiments, a color filter 212 synthesizes and/or assigns a pixel integer value, e.g., by averaging and/or smoothing values from adjacent pixels (e.g., demosaic). The methods and processes herein may use analog methods to obstruct features of an image 104, such as distortion lens 102 and/or may use the processor 110 to synthesize, assign, modify, and/or fix pixel values in the image 104.

As used herein, bit value range refers to a range of groupings (e.g., reds). Modification of the bit value range for a grouping of red may obstruct/obscure AI algorithms used to detect blushing, heart rate, and/or other color information to detect blood flow of the user. For example, the filter 212 may obstruct the bit value for a color/shade of red light and reduce the resolution of the red light passed to the camera 106. Other bit value ranges (e.g., blues, greens, etc.) may also be used to identify and/or collect biometric data.

The filter 212 can prevent a biometric algorithm from calculating a pulse or heart rate of a person through an image 102. Similarly, filter 212 can control firmware 111 and reduce a frame rate (fps) for the camera 106 may not be discernable to a user viewing an image 102 displayed on a screen but may prevent or inhibit the biometric algorithm from determining a user's heart rate. The filter 212 can obstruct biometric algorithms from collecting the biometric data of a user without obstructing the perspective view of another user of the system 100. In this way, system 100 can protect a user from unconsented biometric data collection without noticeably affecting the perceived user experience of an operator, e.g., on a video conference call.

In some embodiments, the filter 212 is an image modifier 214 having a distortion lens 108 that physically covers the camera 106 (e.g., over an aperture of the distortion lens 108). The filter 212 may include software and/or hardware that is part of the camera 106. For example, firmware 111 and/or distortion lens 108 of the camera 106. In other embodiments, the filter 212 may include software and/or hardware that is separate from the camera 106 and physically and/or electronically coupled. For example, the filter 212 (e.g., software and/or hardware) may include firmware 111 that is part of the computing device 104 or another hardware component.

The firmware 111 utilizes the processor 110 to inhibit biometric data collection from the image in response to the switch being in the filtering position 202 when the image is captured, for example, by controlling a frame rate (fps) of the camera 106. In some embodiments, when the switch 200 is in the filtering position 202, a distortion lens 108 covers the aperture of the camera 106. In other words, the distortion lens 108 inhibits the bit values of visible light used to determine a user's heart rate.

The image modifier 214 comprises a sliding mechanism that, for example, covers an aperture on a camera 106 with two or more positions on switch 200. The image modifier 214 can be directly coupled to switch 200, such that the position of the image modifier determines which features 128 are collected and which are inhibited. In one embodiment, the image modifier 214 has an opening 206 in a first position 220, a filter 212 in a second position 222, and a cover 208 in a third position 224. The image modifier 214 can slide over an aperture of the camera 106.

The image modifier 214 slides a filter 212 in different locations so that the opening 206 is supported over the camera 106 in the first position 220. Similarly, the image modifier 214 slides the filter 212 over the camera 106 in the second position 222. For example, filter 212 may include a distortion and/or distortion lens 108. When filter 212 is in the second position 222, the distortion lens 108 is located and/or supported by the image modifier 214 over the aperture of the camera 106. In the third position 224, the cover 208 completely covers the aperture of the camera 106.

As discussed above, the filtering position 202 of the switch 200 may inhibit biometric data collection of a user-selected feature 128. However, in various embodiments, the user may consent to biometric algorithms configured to collect some biometric data but not to others. For example, a user may consent over a teleconference with their physician to permit a biometric algorithm to collect biometric data related to a heart rate but block the biometric algorithm for other (e.g., business) video conferences. In embodiments, firmware 111 operating the camera 106 may be user-controlled to permit consented biometric algorithms and collect biometric data when switch 200 is in the filtering position 202. For example, the user may select some features 128 for biometric collection, e.g., by their doctor over a secure connection on the data network 112.

Similarly, the same user may select features 128 that are not collected and/or are inhibited when another user, such as a business colleague, is teleconferencing with the user. When the switch 200 is in the filtering position 202, a firmware 111 of the camera 106 can operate the processor 110 to inhibit a first biometric algorithm 216 but permit a second biometric algorithm 216. For example, the user may permit an eye doctor to collect biometric data related to pupil dilation but not related to heart rate.

The filter 212 may modify an image 102 that includes an audio/visual signal 130. As used herein, the image 102 is an audio/visual signal that is captured/measured by a sensor (e.g., camera 106) from a phenomenon in the environment, e.g., a digitally recorded movie. In various embodiments, the image 102 can be modified to remove biometric data either before or after the signal created by the reaches the sensor. For example, the filter 212 may include a distortion lens 108, a physical muffler to modify audio signals 130, a firmware 111 that controls the processor 110, and/or a combination thereof. The filter 212 may include an image modifier 214 that modifies audio/visual signals. For example, the image modifier 214 may include a switch 200 that selectively filters light and sound passing through the image modifier 214.

For example, the image modifier 214 can have an opening 206, a distortion lens 108, and/or a cover 208. The opening 206 filters very little, or no light, passing through the image modifier 214. In contrast, the cover 208 blocks most or all the light reaching the image modifier 214 to obstruct the image 102 and prevent the biometric data collection of the audio/video signal 130. A distortion lens 108 may also be included in the image modifier 214 that filters one or more features 128 of the image 102 and inhibits biometric data collection or analysis of the selected features 128.

In various embodiments, the image modifier 214 includes a first distortion lens 108 to obstruct biometric data collection of a first feature 128 and a second distortion lens 108 to obstruct biometric data collection of the first feature 128 and a second feature 128. For example, the first distortion lens 108a may be located in the opening 206 adjacent to the second distortion lens 108b and the cover 208. In this way, the image modifier 214 can selectively control which features 128 are filtered and which features 128 are permitted for a biometric algorithm to assess and/or collect biometric data.

The processor 110 is generally configured to detect, capture, and/or modify various features 128 on the hardware component 120 (e.g., capturing the image 102 or audio signal 130) before the biometric data is transmitted from the computing device 104 onto the data network 112. Features 128 captured by the camera 106 and/or microphone 124 are modified by firmware 111 of a hardware component 120 in response to detecting that the switch 200 is in a filtering position 202. For example, a video codec and/or an audio codec may modify the captured image 102 or audio signal 130 when the switch 200 is in the filtering position 202.

The processor 110 may moderate or control a hardware component 120 through an electronic connection of the circuit board. For example, the processor 110 may operate the camera 106 at a reduced frame per second (fps) rate in response to the switch 200 being in the filtering position 202. For example, processor 110 may operate the camera 106 to capture a reduced resolution of red light in response to the switch 200 being in the filtering position 202.

The processor 110 may regulate one or more computing devices 104 such as a secure hardware dongle or other hardware appliance device, e.g., a set-top box, a network appliance, etc. In various embodiments, the computing device 104 may include a head-mounted display, a laptop computer, a server 114, a tablet computer, a smartphone, a security system, a network router or switch, or the like. The processor 110 may connect to the computing device 104 either by a wired connection (e.g., a universal serial bus ("USB") connection) or a wireless connection (e.g., Bluetooth®, Wi-Fi, near-field communication ("NEC"), LTE, 5G, or the like).

A hardware device of the processor 110 and/or a hardware component 120 may include a power interface, a wired and/or wireless network interface, a graphical interface that attaches to a display 122, and/or a semiconductor integrated circuit device as described below, configured to perform the functions described herein. The processor 110 may be configured to control one or more computing devices 104 to selectively enable and/or disable the camera 106 from capturing various features 128 from the image 102 commonly used in biometric data collection. For example, processor 110 may include firmware 111 that creates a different image 102 with biometric data that is different from the image 102 captured by the camera 106 without the firmware 111. Similarly, a distortion lens 108 may obstruct certain features 128 in image 102 and prevent the collection, storage, and/or retrieval of biometric data from the image 102. The firmware 111 on the processor 110 can similarly modify and/or obstruct the biometric data collection of other features 128 and/or hardware components 120. For example, the firmware on the processor 110 may modify the biometric data collection of audio signals 130 either received at the microphone 124, stored in memory, and/or transmitted through the speaker 126.

The processor 110 of the computing device 104 may include a semiconductor integrated circuit device (e.g., one or more chips, die, or other discrete logic hardware) or the like. For example, the circuit may be a field-programmable gate array ("FPGA") or other programmable logic, firmware for an FPGA or other programmable logic, microcode for execution on a microcontroller. For example, the processor 110 may be an application-specific integrated circuit ("ASIC"), an FPGA processor, a processor core, or the like. The processor 110 may be mounted on a printed circuit board with one or more electrical lines or connections (e.g., volatile memory, a non-volatile storage medium, a network interface, a peripheral device, a graphical/display interface, or the like).

The hardware component 120 and/or the processor 110 may include one or more pins, pads, or other electrical connections configured to send and receive data (e.g., in communication with one or more electrical lines of a printed circuit board or the like). One or more hardware circuits and/or other electrical circuits may perform various functions of the circuit board of the computing device 104 and/or the processor 110. The processor 110 can electrically couple to the circuit board in the computing device 104 and/or remotely couple to the hardware component 120 to enable or disable features 128 in the firmware 111. For example, to turn on/off the features 128 associated with biometric data collection in the audio signal and/or image 102.

The semiconductor integrated circuit device of the circuit board, for example, on the computing device 104 or the processor 110, includes and/or is communicatively coupled to one or more volatile memory media, which may include but is not limited to random access memory ("RAM"), dynamic RAM ("DRAM"), cache, or the like. In embodiments, the semiconductor integrated circuit device, the circuit board, or other hardware appliances of the processor 110 and/or the computing device 104 include and/or is/are communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 112, in various embodiments, includes a digital communication network that transmits digital communications, for example, between a computing device 104 and a server 114 having the processor 110. The data network 112 may include a wireless network, such as a wireless cellular network, a local wireless network, a Wi-Fi network, a Bluetooth® network, a near-field communication ("NEC") network, an ad hoc network, and/or the like. The data network 112 may include a wide area network ("WAN"), a storage area network ("SAN"), a local area network ("LAN") (e.g., a home network), an optical fiber network, the internet, or another digital communication network. The data network 112 may include two or more networks. The data network 112 may include one or more servers 114, routers, switches, and/or other networking equipment. The data network 112 may also include one or more computer-readable storage media, such as a hard disk drive, an optical drive, non-volatile memory, RAM, or the like.

The wireless connection may be a mobile telephone network. The wireless connection may also employ a Wi-Fi network based on any Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection of data network 112 may be through an infrared connection, including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of this application's filing date.

One or more servers 114 may be embodied as blade servers, mainframe servers, tower servers, rack servers, etc., in one embodiment. The one or more servers 114 may be configured as mail servers, web servers, application servers, FTP servers, media servers, data servers, web servers, file servers, virtual servers, and/or the like. Servers 114 may be communicatively coupled (e.g., networked) over a data network 112 to one or more computing devices 104 and may be configured to execute or run machine learning algorithms, programs, applications, processes, and/or the like.

For example, the video codec of GPU enhances features 128 of the computing device 104 by providing a standardized format for communicating with the system software. When properly configured with the appropriate firmware 111, GPU enhances the computing device 104 with the various features 128 provided by the video codec to compress/decompress, communicate, transmit, and/or display video signals. However, each of these features 128 is only available to the computing device 104 if the data region is enabled and the appropriate firmware 111 is installed and readable by the system software for the specific video codec and/or GPU feature. In this way, the firmware 111 can control the video codec, GPU, and or display. the processor 110 and/or distortion lens 108 of the computing device 104 inhibit the collection, storage, and/or retrieval of biometric data from the image 102.

Figure 4:
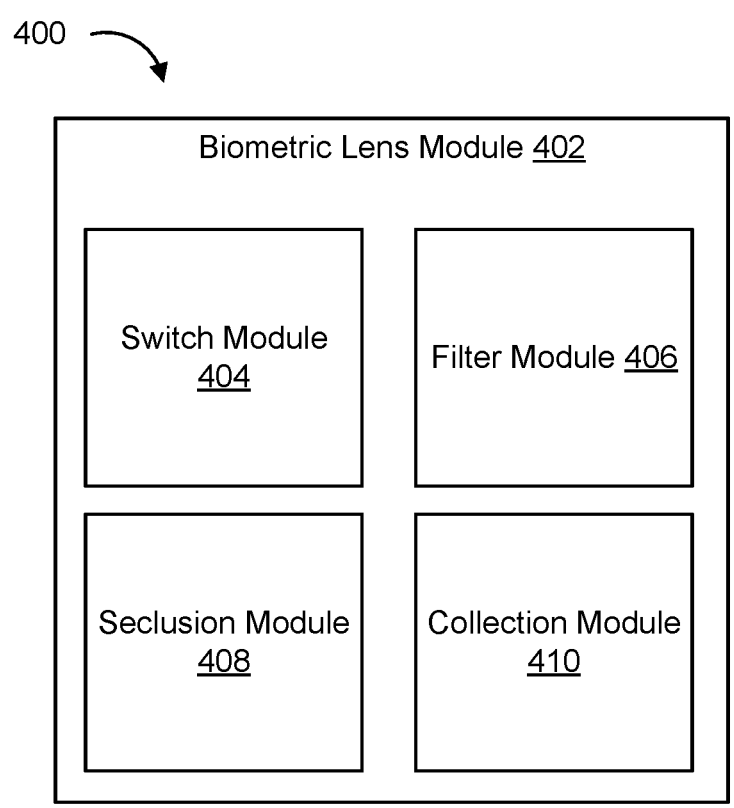
FIG. 4 is a schematic block diagram illustrating one embodiment of an apparatus for filtering a feature of an audio/video signal during operation of the computing device.

FIG. 4 illustrates an apparatus 400 for filtering a feature of an audio/video signal 130 during operation of the computing device 104. Apparatus 400 includes a biometric lens module 402. The biometric lens module 402 includes analog and/or digital means to modify an image 102. Specifically, the biometric lens module 402 includes a switch module 404, a filter module 406, a seclusion module 408, and a collection module 410.

In operation, the apparatus 400 may operate the biometric lens module 402 in firmware 111 and/or in the processor 110 to modify the image 104 captured by the camera 106, e.g., when the switch 200 is in the filtering position 202. The switch module 404 detects the position of the switch 200 to determine whether the switch is in the filtering position 202 or the non-filtering position 204. When the switch module 404 determines that switch 200 is in the filtering position 202, the biometric lens module 402 operates the filter module 406 to filter the image 102 captured by the camera 106.

In various embodiments, filter module 406 may provide different functions depending on the switch 200 positions determined by the switch module 404. For example, in the non-filtering position 204, the opening 206 may not modify the image 102 captured by the camera 106 and not operate the filter module 406. In one embodiment, the non-filtering position 204 may become enabled only when biometric data is not being collected and/or the data network 112 is secure. In embodiments, the covering position 210 may indicate to the switch module 404 that the filter module 406, seclusion module 408, and/or collection module 410 are unnecessary because the signal is physically obstructed.

When the switch module 404 determines that switch 200 is in the filtering position 202, the switch module 404 operates the filter module 406 to modify the image 102 captured by the camera 106 while switch 200 is detected in the filtering position 202. In various embodiments, filter module 406 may control camera 106 to reduce the resolution of red light captured by the camera 106, operate the camera 106 at a different rate of speed, reduce a resolution of eye dilation, and/or modify the image 102 after it is captured by the camera 106. The filter module 406 can be selectively operated to select which features 128 are inhibited and/or filtered out of the image 102 and modifying the image 102 to inhibit biometric data collection from the image 102 in response to the switch 200 being in the filtering position 202 while the image 102 is captured.

In other words, firmware 111 can be programmed to select which features 128 are inhibited. In embodiments, features 128 selectively filtered from the image 102 can be modified at run-time by operating seclusion module 408 to modify the filter module 406 and select and/or change the features 128 modified from the image 102.

The seclusion module 408 may operate in the biometric lens module 402 of the camera 106 firmware 111 to seclude or remove certain features 128 from the image 102 captured by the camera 106 and seclude the biometric data prior to collection or analysis by biometric artificial intelligence (AI) algorithms. The seclusion module 408 operates the camera 106 to occlude and/or inhibit biometric data collection. Similarly, seclusion module 408 permits analysis for the user-selected features 128 and filters data used in a biometric algorithm to calculate personal biometric information, thereby inhibiting biometric data collection.

In various embodiments, the collection module 410 collects the modified image 102 and/or signals 130 to analyze the biometric algorithms and firmware 111. The collection module 410 collects and stores the user-selected biometric data that is filtered and/or collected. In various embodiments, the collection module 410 collects user consented biometric data and uses a biometric algorithm to calculate personal biometric information when consented and selected by the user of the camera 106 firmware 111. Collectively, the modules within the biometric lens module 402 operate to create a virtual filter 212 for the camera 106 and remove biometric data from the image 102. The biometric lens module 402 enables selective feature 128 capture/removal and may be used independently or in conjunction with a physical filter 212 such as a distortion lens 108.

Figure 5:
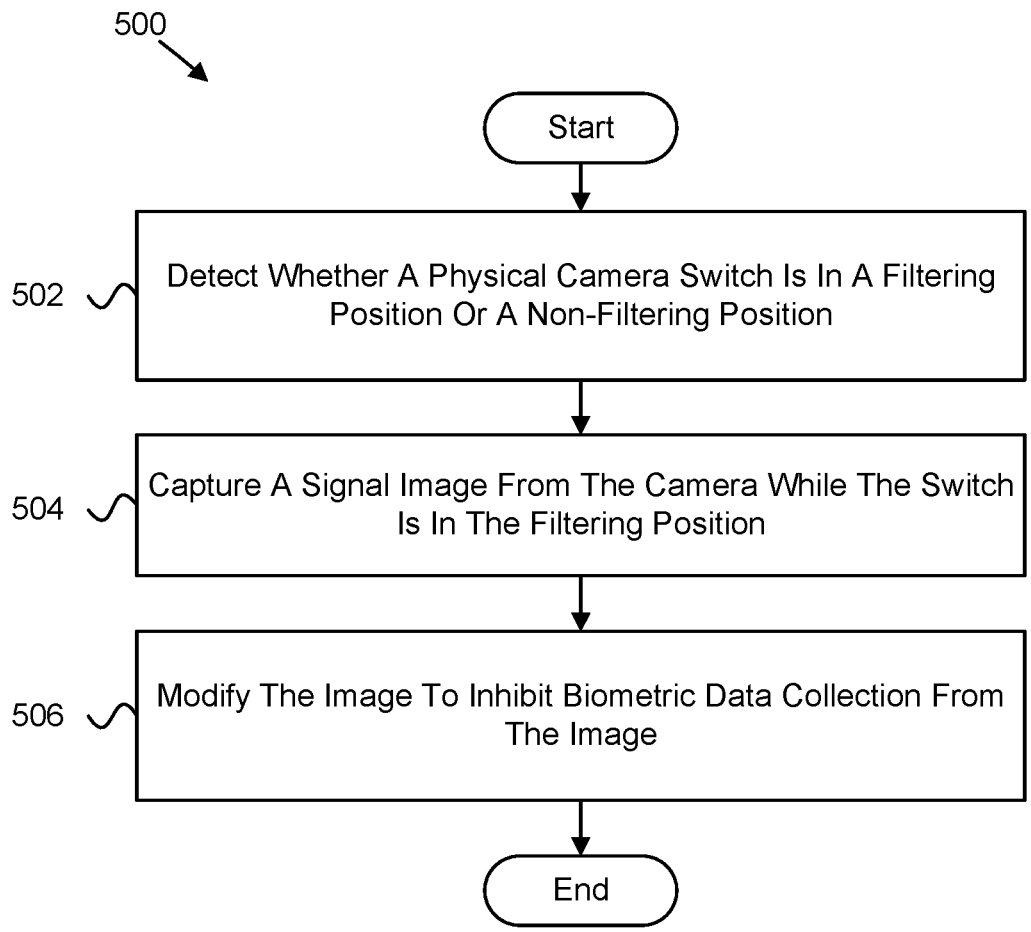
FIG. 5 is a schematic flow chart diagram illustrating one embodiment of a method for detecting and selectively modifying the captured image to inhibit biometric data collection.

FIG. 5 is a schematic block diagram illustrating a method 500 for detecting a position of the switch 200 and selectively modifying features 128 of the image 102 and/or audio file captured by the camera 106. In one embodiment, method 500 involves using the processor 110 of an electronic device to detect 502 the position of the physical camera switch 200. The switch 200 has a filtering position 202 and a non-filtering position 204. The camera 106 of the electronic/computing device 104 captures 504 an image 102 while the switch 200 is detected by the processor 110 in the filtering position 202. The image 102 is modified 506 by the distortion lens 108 and/or the processor 110 to inhibit biometric data collection on the computing device 104 and/or the data network 112. In other words, in response to the switch 200 being in the filtering position 202 while the image 102 and/or audio signal 130 is being captured 504 on the computing device 104, the filter 212, distortion lens 108, and/or processor 110 inhibit biometric data collection by modifying 506 at least one feature 128 of the image 102 and/or audio signal 130.

Figure 6:
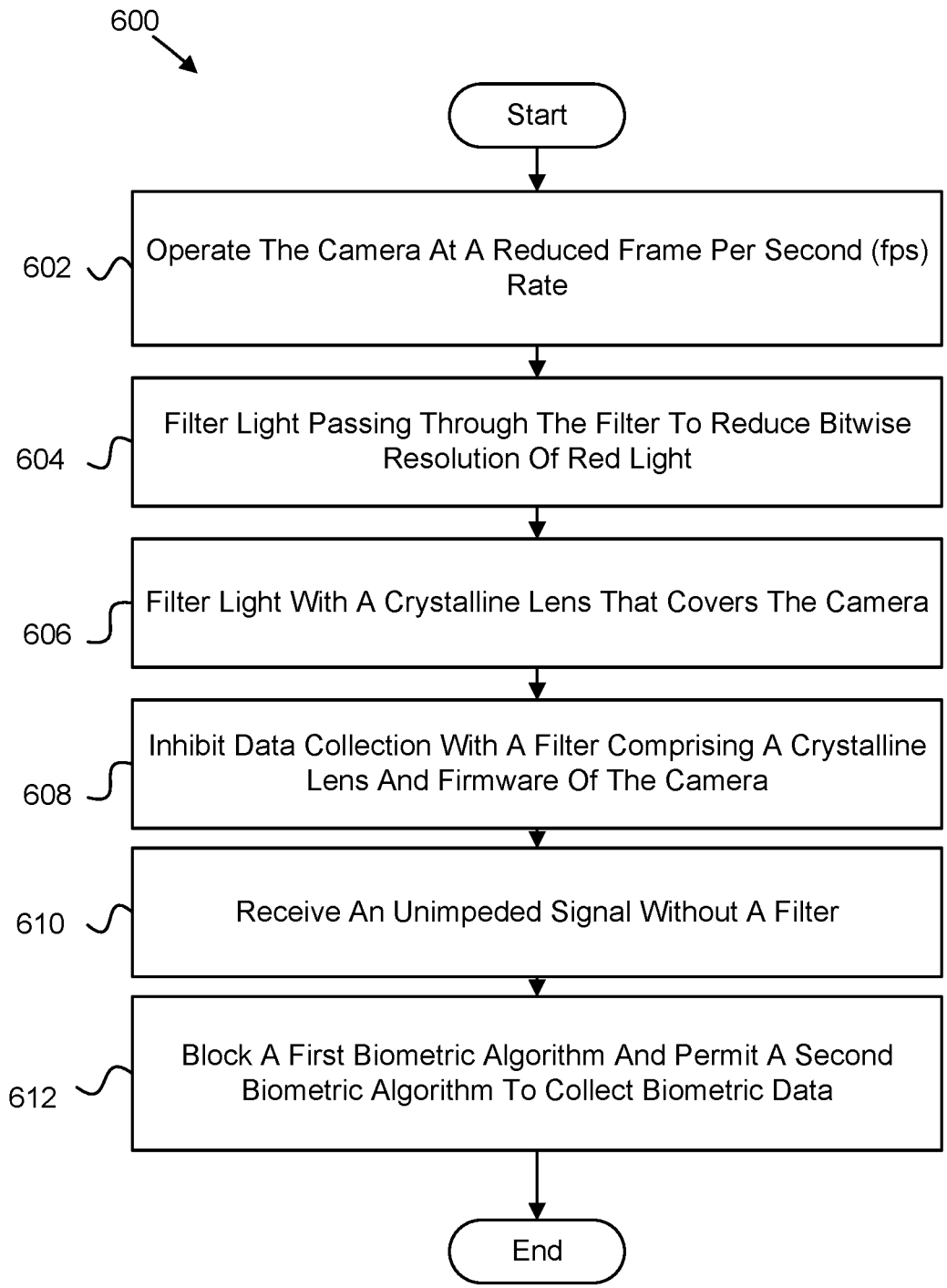
FIG. 6 is a schematic flow chart diagram illustrating optional methods for the embodiment shown in FIG. 5 to modify the captured image and inhibit biometric data collection selectively.

FIG. 6 is a schematic block diagram illustrating various optional methods 600 of the method 500 shown in FIG. 5 for selectively modifying 506 features 128 of an image 102/signal 130 captured 504 by a computing device 104 when the switch 200 is detected 502 to be in the filtering position 202. For example, method 600 further involves operating 602 the camera 106 at a reduced frame per second (fps). The camera 106 may be operated 604 to capture a reduced bitwise resolution of red light.

In embodiments, filter 212 is an image modifier 214 comprising a distortion lens 108 that covers the camera 106 and inhibits 606 biometric data collection. The filter 212 and the firmware 111 for the camera 106 utilizes the processor 110 to inhibit 608 biometric data collection from the image 102 in response to the switch 200 being in the filtering position 202 while the image 102 is captured by the camera 106. A similar method includes using a filter 212 for an audio modifier that covers the microphone 124. In various embodiments, a processor 110 to control firmware 111 of the microphone 124 may inhibit biometric data collection from an audio signal 130.

In some embodiments, the switch 200 permits the image 102 and/or audio signal 130 to pass unimpeded. For example, the switch 200 may include an opening 206 for the camera 106 and/or the microphone 124 to receive 610 unfiltered light/audio without a filter 212. In one embodiment, the opening 206 is adjacent to the filter 212. In this configuration, the image modifier 214 can move between a covered position 210 that inhibits all light, the filtering position 202, and the non-filtering position 204 that receives unfiltered light through the opening 206. In one embodiment, the filtering position 202 has a distortion lens 108 that filters the light.

In various embodiments, when the switch 200 is in the filtering position 202, a firmware 111 operates the camera 106 and/or microphone 124 to block 612, a first biometric algorithm 216 from collecting biometric information and permits a second biometric algorithm 216 to collect data related to user-consented biometric data.

As appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, embodiments may take the form of a program product embodied in one or more computer-readable storage devices storing machine-readable code, computer-readable code, and/or program code, referred hereafter as code. The storage devices may be tangible, non-transitory, and/or non-transmission. The storage devices may not embody signals. In a specific embodiment, the storage devices only employ signals for accessing code.

Many of the functional units described in this specification have been labeled as modules to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together but may comprise disparate instructions stored in different locations that, when joined together logically, comprise the module and achieve the module's stated purpose.

A code module may be a single instruction or many instructions and may even be distributed over several different code segments, among various programs, and across several memory devices. Similarly, operational data may be identified and illustrated herein within modules and may be embodied in any suitable form and organized within any appropriate data structure type. The operational data may be collected as a single data set or distributed over different locations, including other computer-readable storage devices. Where a module or portions of a module are implemented in software, the software portions are stored on one or more computer-readable storage devices.

Any combination of one or more computer-readable mediums may be utilized. The computer-readable medium may be a computer-readable storage medium. The computer-readable storage medium may be a storage device storing the code. The storage device may be, for example, but not limited to, an electronic, magnetic, optical, electro-magnetic, infrared, holographic, micromechanical, or semiconductor system, apparatus, or device, or any suitable combination of the foregoing.

More specific embodiments (a non-exhaustive list) of the storage device would include the following: an electrical connection having one or more wires, a portable computer diskette, a hard disk, a random-access memory (RAM), a read-only memory (ROM), an (electronically) erasable programmable read-only memory (EPROM, EEPROM, and/or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for various embodiments may be written in any combination of one or more programming languages, including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive unless expressly specified otherwise. The terms "a," "an," and "the" also refer to "one or more" unless expressly specified otherwise.

Furthermore, the described features, structures, or characteristics of the embodiments may combine in any suitable manner. In the following description, numerous specific details are provided, such as embodiments of programming, software modules, user selections, network transactions, database queries, database structures, hardware modules, hardware circuits, hardware chips, etc., to provide a thorough understanding of embodiments. However, one skilled in the relevant art would recognize that embodiments may be practiced without one or more of the specific details or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. Each block of the schematic flowchart diagrams and/or schematic block diagrams, and combinations of blocks in the schematic flowchart diagrams and/or schematic block diagrams, can be implemented by code. This code may be provided to a processor of a general-purpose computer, a cellphone, a special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, another programmable machine, or other devices to produce a computer-implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may indicate only the logical flow of the depicted embodiment. For instance, an arrow may indicate a waiting or monitoring period of unspecified duration between the illustrated embodiment's enumerated steps. Each block of the block diagrams and/or flowchart diagrams, and combinations of blocks in the block diagrams and/or flowchart diagrams, can be implemented by particular/special purpose hardware-based systems that perform the specified functions or acts or combinations of special purpose hardware and code.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. Therefore, the scope of the invention is indicated by the appended claims rather than by the foregoing description. All changes which come within the meaning and range of equivalency of the claims are to be embraced within their scope.

What is claimed is:

1. A camera comprising:
   a physical switch on an external surface of the camera that selectively moves between a filtering position that uses digital filters to inhibit biometric data collection and a non-filtering position that does not use the digital filters to inhibit the biometric data collection; and
   an image modifier that captures an image, wherein when the physical switch is in the filtering position, the image modifier:
      captures the image while the physical switch is detected to be in the filtering position; and
      modifies the image before the image leaves the camera using the digital filters to inhibit the biometric data collection from the image in response to the physical switch being in the filtering position while the image is captured.

2. The camera of claim 1, wherein the image modifier is coupled to the physical switch and disrupts a biometric algorithm that prevents biometric collection.

3. The camera of claim 1, wherein the image modifier comprises a distortion lens that obscures a portion of visible light passing through the distortion lens to the camera.

4. The camera of claim 1, further comprising a processor that operates the camera at a reduced frame per second (fps) rate in response to the physical switch being in the filtering position.

5. The camera of claim 4, wherein the image modifier has a distortion lens in the filtering position.

6. The camera of claim 1, further comprising an image modifier having a distortion lens that covers the camera and a firmware uses a processor to inhibit biometric data collection from the image in response to the physical switch being in the filtering position while the image is captured.

7. The camera of claim 1, further comprising an image modifier coupled to the physical switch, wherein the image modifier comprises an opening in a first position, a filter in a second position, and a cover in a third position.

8. The camera of claim 7, wherein the image modifier slides over the camera so that the opening is over the camera in the first position, the filter is over the camera in the second position, and the cover is over the camera in the third position.

9. The camera of claim 1, wherein when the physical switch is in the filtering position, a firmware that operates the camera permits a selected biometric algorithm that a user consented to collect biometric data.

10. The camera of claim 1, wherein the physical switch in the filtering position includes a blur filter that covers the camera and reduces a resolution of the image by inhibiting a least significant bit value for visible light.

11. The camera of claim 10, wherein when the physical switch is in the filtering position, a firmware operates a processor to inhibit a first biometric algorithm and permit a second biometric algorithm.

12. A method at a camera, the method comprising:
   capturing an image using the camera while a physical camera switch on an external surface of the camera is in a filtering position that uses digital filters to inhibit biometric data collection; and
   modifying the image before the image leaves the camera using the digital filters to inhibit the biometric data collection from the image in response to the physical camera switch being in the filtering position while the image is captured.

13. The method of claim 12, wherein modifying the image includes operating the camera at a reduced frame per second (fps).

14. The method of claim 12, wherein modifying the image includes operating the camera with a blur filter that covers the camera and causes the camera to capture a reduced bitwise resolution of red light.

15. The method of claim 12, further comprising a filter comprising a distortion lens that covers the camera and a firmware of the camera that utilizes a processor to inhibit biometric data collection from the image in response to the physical camera switch being in the filtering position while the image is captured.

16. The method of claim 12, wherein when the physical camera switch is in the filtering position, a firmware operates the camera to block a first biometric algorithm from collecting biometric information and permits a second biometric algorithm to collect data related to user-consented biometric data.

17. The method of claim 12, further comprising an opening that receives unfiltered light without a filter.

18. The method of claim 17, wherein the opening is adjacent to the filter, wherein an image modifier moves between a covered position that inhibits all light, the filtering position, and a non-filtering position that receives unfiltered light through the opening.

19. The method of claim 18, wherein the filtering position comprises a distortion lens that obfuscates a facial feature and distorts the image via the distortion lens.

20. A computer program product, comprising a non-transitory computer-readable storage medium having program instructions embodied therewith, the program instructions are executable by a processor to cause the processor to:

detect, by use of the processor of an electronic device, a position of a physical camera switch on an external surface of a camera of the electronic device, wherein the physical camera switch comprises a filtering position that uses digital filters to inhibit biometric data collection and a non-filtering position that does not use the digital filters to inhibit the biometric data collection;

capture an image using the camera while the physical camera switch is detected to be in the filtering position; and modify the image before the image leaves the electronic device using the digital filters to inhibit the biometric data collection from the image in response to the physical camera switch being in the filtering position while the image is captured.

\* \* \* \* \*